US012700429B2

(12) United States Patent
Sun et al.

(10) Patent No.: US 12,700,429 B2
(45) Date of Patent: Aug. 4, 2026

(54) METHODS, DEVICES, READABLE MEDIA AND ELECTRONIC DEVICES FOR VIDEO PROCESSING

(71) Applicant: Beijing Youzhuju Network Technology Co., Ltd., Beijing (CN)

(72) Inventors: Jia Sun, Beijing (CN); Zehuan Yuan, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/832,049

(22) PCT Filed: Jan. 4, 2023

(86) PCT No.: PCT/CN2023/070262
§ 371 (c)(1),
(2) Date: Jul. 22, 2024

(87) PCT Pub. No.: WO2023/142913
PCT Pub. Date: Aug. 3, 2023

(65) Prior Publication Data
US 2025/0118338 A1 Apr. 10, 2025

(30) Foreign Application Priority Data
Jan. 29, 2022 (CN) ......................... 202210113116.0

(51) Int. Cl.
*G11B 27/036* (2006.01)
*G06V 20/40* (2022.01)
(Continued)

(52) U.S. Cl.
CPC ............ *G11B 27/036* (2013.01); *G06V 20/41* (2022.01); *G06V 20/49* (2022.01); *G06V 20/62* (2022.01); *G06V 30/19093* (2022.01)

(58) Field of Classification Search
CPC ...... G11B 27/036; G06V 20/49; G06V 20/62; G06V 20/41; G06V 30/19093
See application file for complete search history.

(56) References Cited

U.S. PATENT DOCUMENTS

2016/0070962 A1 3/2016 Shetty et al.
2021/0224550 A1* 7/2021 Zeng ...................... G11B 27/28
2022/0262119 A1* 8/2022 He ......................... G06V 20/47

FOREIGN PATENT DOCUMENTS

CN 104540044 A 4/2015
CN 111182358 A 5/2020
(Continued)

OTHER PUBLICATIONS

International Search Report for PCT/CN2023/070262, mailed May 30, 2023, 6 pages.
(Continued)

*Primary Examiner* — Mishawn N. Hunter
(74) *Attorney, Agent, or Firm* — Astute IP Law Group

(57) ABSTRACT
The disclosure relates to a video processing method, device, readable medium and electronic equipment. The method includes: obtaining key information corresponding to a video to be processed; extracting one or more target video clips from the video to be processed based on the key information; and obtaining a target video by adding the target video clip to a position preceding a specified video frame in the video to be processed, the specified video frame being any video frame of a preset number of video frames in the video to be processed.

17 Claims, 3 Drawing Sheets

(51) Int. Cl.
*G06V 20/62* (2022.01)
*G06V 30/19* (2022.01)

(56) References Cited

FOREIGN PATENT DOCUMENTS

| CN | 111757170 | A | 10/2020 | | |
|----|-----------|---|---------|---|---|
| CN | 112668561 | A | 4/2021 | | |
| CN | 113536036 | * | 10/2021 | ............ | G06F 16/74 |
| CN | 113536036 | A | 10/2021 | | |
| CN | 113591530 | A | 11/2021 | | |
| CN | 113672765 | A | 11/2021 | | |
| CN | 114445754 | A | 5/2022 | | |

OTHER PUBLICATIONS

First Office Action for Chinese Patent Application No. 202210113116.
0, mailed on May 13, 2025, 23 pages.
Zhongwei S., et al., "Research on an audio-assisted video segmentation method", Journal of Nanjing University (Natural Science Edition), vol. 38, No. 2, Apr. 30, 2020, 6 pages, with English Abstract.

* cited by examiner

OBTAIN KEY INFORMATION CORRESPONDING TO A VIDEO TO BE PROCESSED — S101

EXTRACT ONE OR MORE TARGET VIDEO CLIPS FROM THE VIDEO TO BE PROCESSED BASED ON THE KEY INFORMATION — S102

OBTAIN A TARGET VIDEO BY ADDING THE TARGET VIDEO CLIP TO A POSITION PRECEDING A SPECIFIED VIDEO FRAME IN THE VIDEO TO BE PROCESSED — S103

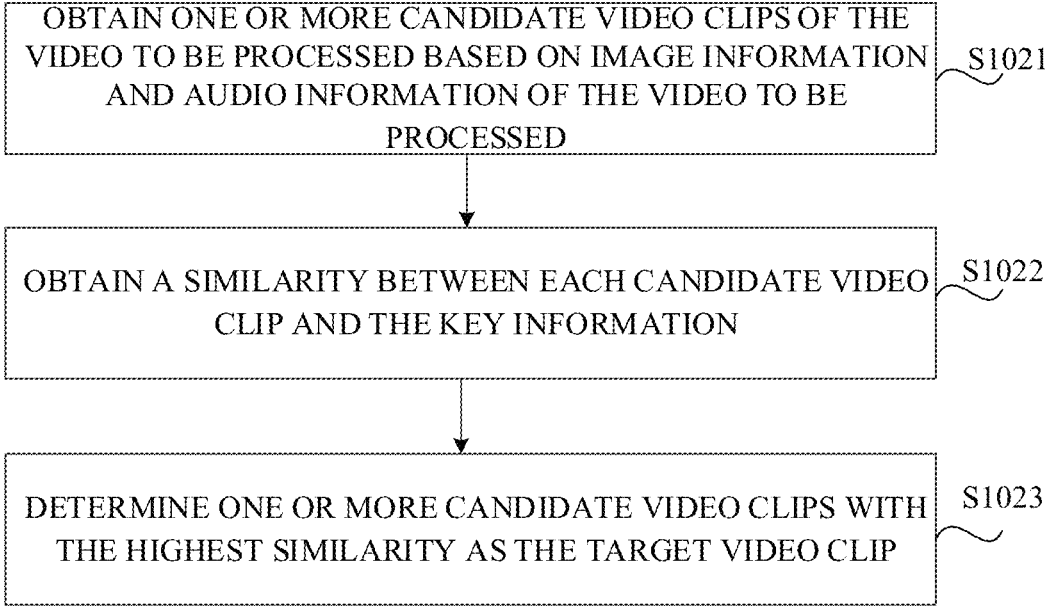

OBTAIN ONE OR MORE CANDIDATE VIDEO CLIPS OF THE VIDEO TO BE PROCESSED BASED ON IMAGE INFORMATION AND AUDIO INFORMATION OF THE VIDEO TO BE PROCESSED — S1021

OBTAIN A SIMILARITY BETWEEN EACH CANDIDATE VIDEO CLIP AND THE KEY INFORMATION — S1022

DETERMINE ONE OR MORE CANDIDATE VIDEO CLIPS WITH THE HIGHEST SIMILARITY AS THE TARGET VIDEO CLIP — S1023

FIG. 2

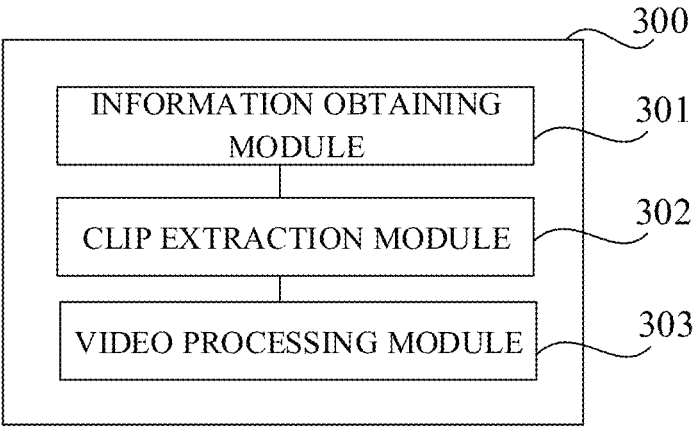

300

INFORMATION OBTAINING MODULE — 301

CLIP EXTRACTION MODULE — 302

VIDEO PROCESSING MODULE — 303

METHODS, DEVICES, READABLE MEDIA AND ELECTRONIC DEVICES FOR VIDEO PROCESSING

This is a national stage application based on International Patent Application No. PCT/CN2023/070262, filed Jan. 4, 2023, which claims benefit of Chinese Patent Application No. 202210113116.0 filed on Jan. 29, 2022, titled "METHODS, DEVICES, READABLE MEDIA AND ELECTRONIC DEVICES FOR VIDEO PROCESSING", the disclosures of which are incorporated herein by reference in their entireties.

FIELD

The present disclosure relates to computer field, specifically, to methods, devices, readable medium and electronic devices for video processing.

BACKGROUND

With the development of computer technology, multimedia applications are becoming more and more widespread, and various videos are constantly emerging on the Internet. Among a large number of online videos, it is difficult for users to quickly determine the video they need based on their own needs.

SUMMARY

This summary is provided to introduce in brief form ideas that are described in detail in the detailed description that follows. This summary is not intended to identify key features or essential features of the claimed technical solution, nor is it intended to be used to limit the scope of the claimed technical solution.

In a first aspect, the present disclosure provides a video processing method, which comprises:

obtaining key information corresponding to a video to be processed;

extracting one or more target video clips from the video to be processed based on the key information;

obtaining a target video by adding the target video clip to a position preceding a specified video frame in the video to be processed, the specified video frame being any video frame of a top preset number of video frames in the video to be processed.

In a second aspect, the present disclosure provides a device for video processing, which comprises:

an information obtaining module for obtaining key information corresponding to a video to be processed;

a clip extraction module for extracting one or more target video clips from the video to be processed based on the key information; and a video processing module for obtaining a target video by adding the target video clip to a position preceding a specified video frame in the video to be processed, the specified video frame being any video frame of a top preset number of video frames in the video to be processed.

In a third aspect, the present disclosure provides a computer-readable medium having a computer program stored thereon, and the program, when executing by a processing device, implements the steps of the method described in the first aspect of the present disclosure.

In a fourth aspect, the present disclosure provides an electronic device, comprising:

a storage device having a computer program stored thereon;

a processing device for executing the computer program in on storage device to implement the steps of the method of method described in the first aspect of the present disclosure.

Applying the above technical solution, key information corresponding to a video to be processed is obtained; one or more target video clips are extracted from the video to be processed based on the key information; the target video clip is added to a position preceding a specified video frame in the video to be processed to obtain a target video, the specified video frame is any video frame of a preset number of video frames in the video to be processed. In this way, after browsing the target video, users can quickly watch a target video clip with the highest similarity to the key information of the target video, allowing the users to quickly identify whether the target video meets their own needs. On the one hand, it can improve efficiency of selection videos by the users. On the other hand, it also enables the video effectively attracting users in need to watch.

Other features and advantages of the present disclosure will be detailed in the detailed description section that follows.

BRIEF DESCRIPTION OF THE DRAWINGS

The above and other features, advantages and aspects of various embodiments of the present disclosure will become more apparent with reference to the following detailed description in conjunction with the accompanying drawings. Throughout the drawings, the same or similar reference numbers refer to the same or similar elements. It is to be understood that the drawings are schematic, and components and elements are not necessarily drawn to scale. In the accompanying drawings:

FIG. 2 is a flow chart of step S102 based on embodiments shown in FIG. 1.

FIG. 3 is a block diagram of a device for video processing according to example embodiments.

DETAILED DESCRIPTION

Figure 1:
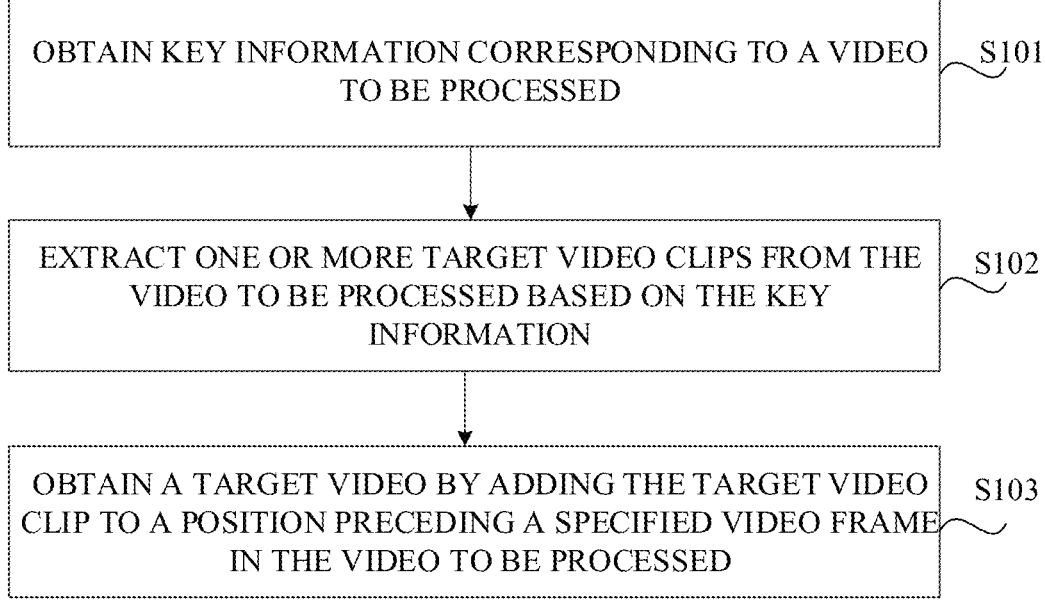
FIG. 1 is a flowchart of a method for video processing according to an example embodiment.

Embodiments of the present disclosure will be described in more detail below with reference to the accompanying drawings. Although certain embodiments of the disclosure are shown in the drawings, it should be understood that the disclosure may be implanted in various forms and should not be construed as limited to the embodiments set forth herein, but rather these embodiments are provided for thoroughness and clarity. to fully understand this disclosure. It should be understood that the drawings and embodiments of the present disclosure are for illustrative purposes only and are not intended to limit the scope of the present disclosure.

It should be understood that various steps described in the method implementations of the present disclosure may be executed in different orders and/or in parallel. Furthermore, method embodiments may include additional steps and/or omit performing of illustrated steps. The scope of the present disclosure is not limited in this aspect.

As used herein, the term "comprise"/"include" and their variations are open-ended, i.e., "comprising but not limited to"/"including but not limited to." The term "based on"

means "based at least in part on." The term "an embodiment" means "at least one embodiment". The term "another embodiment" means "at least one further embodiment". The term "some embodiments" means "at least some embodiments". Relevant definitions of other terms will be given in the description below.

It should be noted that concepts such as "first" and "second" mentioned in this disclosure are only used to distinguish different devices, modules or units, and are not used to limit the order of functions performed by these devices, modules or units or interdependence.

It should be noted that the modifications of "one" and "plurality" mentioned in this disclosure are illustrative and not restrictive. Those skilled in the art will understand that unless the context clearly indicates, it should be understood as "one or more".

Names of messages or information exchanged between multiple devices in embodiments of the present disclosure are for illustrative purposes only and are not used to limit the scope of these messages or information.

First, implementation scenarios of the present disclosure will be described. The present disclosure can be applied to video processing scenarios. With the development of computer technology, various videos continue to emerge on the Internet. Since contents and qualities of different videos vary greatly, when users are looking for a certain type of video according to their own needs, they need to browse a large number of videos to find it. Since the video contents are played in sequence, key information is in the frames during the video playback process, users need to browse a complete video or a large section of video before they can identify whether a video meets their needs. On the one hand, this will make it difficult for users to quickly browse and get the video they need according to their needs; on the other hand, it will lead to that the video cannot effectively attract users in need to watch.

In order to solve above problems, the present disclosure provides a method, device, readable medium and electronic equipment for video processing, which extracts one or more target video clips from a video to be processed based on key information corresponding to the video to be processed; and obtains the target video by adding the target video clip to a position before a specified video frame in the video to be processed, the specified video frame being any video frame among the first present of number of video frames in the video to be processed. In this way, after browsing the target video, users can quickly watch the target video clip with the highest similarity to key information of the target video, allowing the users to quickly identify whether the target video meets their own needs. On the one hand, it can improve efficiency of selection videos by the users. On the other hand, it also enables the video effectively attracting users in need to watch.

Detailed description of the present disclosure will be described in detail below with reference to the accompanying drawings.

FIG. 1 is a method for video processing according to an example embodiment. As shown in FIG. 1, the method includes:

Step 101: key information corresponding to a video to be processed is obtained.

For example, if the video to be processed is a product introduction video, the key information may be selling point information of the product introduced in the video to be processed. Alternatively, if the video to be processed is a popular science knowledge video, the key information may be knowledge information on the popular science knowledge introduced in the video to be processed.

In this step, a video title of the video to be processed can be used as the key information. Alternatively, information input by the user for the video to be processed can be used as the key information. Alternatively, a preset hot word can be used as the key information. Of course, a combination of the above video title, user input information and hot words can also be used as key information.

Step 102: one or more target video clips are extracted from the video to be processed based on the key information.

For example, a similarity between each video frame of the video to be processed and the above key information can be calculated, and one or more target video clips can be obtained based on a combination of top N video frames with the highest similarity.

Step 103: the target video clip is added to a position preceding a specified video frame in the video to be processed to obtain the target video.

The specified video frame may be any video frame among a top preset number of video frames in the video to be processed. The preset number may be a fixed value, such as 10 or 20. The preset number may also be a value determined based on a total number of video frames of the video to be processed. For example, the preset number may be one-fifth or one-tenth of the total number of video frames of the video to be processed.

For example, the first frame of the video to be processed can be used as the specified video frame, so that the target video clip can be added to the front of the video to be processed. As another example, the video frame after the title frame can be used as the specified video frame. In this way, the target video clip can be added to the video to be processed after the title frame and before content frames.

Applying the above technical solution, key information corresponding to the video to be processed is obtained; the one or more target video clips are extracted from the video to be processed based on the key information; the target video clip is added to the position preceding the specified video frame in the video to be processed to obtain the target video, the specified video frame is any video frame of a top preset number of video frames in the video to be processed. In this way, after browsing the target video, users can quickly watch a target video clip with the highest similarity to the key information of the target video, allowing the users to quickly identify whether the target video meets their own needs. On the one hand, it can improve efficiency of selection videos by the users. On the other hand, it also enables the video effectively attracting users in need to watch.

FIG. 2 is a flow chart of step S102 based on embodiments shown in FIG. 1. As shown in FIG. 2, the above step 102 may include the following steps:

Step 1021: one or more candidate video clips of the video to be processed are obtained based on image information and audio information of the video to be processed.

The candidate video clip may include a piece of complete semantic information in the video to be processed.

The video to be processed may be segmented based on an image similarity between adjacent video frame images and an audio similarity between audio frames corresponding to the adjacent video frames, to obtain one or more candidate video clips.

For example, adjacent video frames of which image similarity is less than or equal to a first predetermined image similarity threshold and audio similarity is less than or equal to a first predetermined audio similarity threshold can be used as segmented frames, and the video to be processed is segmented based on the plurality of segmented frames to obtain the one or more candidate video clips.

Step 1022: a similarity between each candidate video clip and the key information is obtained.

Step 1023: the one or more candidate video clips with the highest similarity are used as the target video clip.

For example, a pre-trained video analysis model can be used to determine the similarity between each candidate video clip and the key information, and based on a sorting result of similarities, one or a predetermined number of candidate video clips with the highest similarity can be used as the target video clip.

In this way, video clips that include complete semantic information can be obtained to avoid a semantic truncation in the video clips and the complete semantic information cannot be displayed to the user. Through similarity comparison, one or more candidates with the highest similarity to the key information can be used as the target video clip, so that the target video clip can completely and accurately display the key information of the video to be processed.

In another embodiment of the present disclosure, the above step 1021 may also obtain one or more candidate video clips of the video to be processed in the following manner:

S11. one or more pending video clips of the video to be processed are obtained based on the image information.

Each of the pending video clips includes one or more frames of images.

For example, an image text in each frame of the video to be processed can be obtained. A text similarity of image texts between adjacent frame images can be calculated. The pending video clip can be determined based on the text similarity.

For example, optical character recognition (OCR) can be used to obtain a pending text in each frame of the video to be processed. The pending text can then be used as the image text. Invalid small text can be filtered out based on a text area of each pending text. For example, a pending text of which text area is less than or equal to a predetermined area can be regarded as an invalid small text. Other texts in the pending text except the invalid small text can be regarded as the above image text. Of course, a pending text of which text area is larger than the predetermined area can also be directly used as the above image text.

It should be noted that OCR refers to a process of determining a character shape by detecting dark and light patterns, and then using a character recognition method to translate the character shape into text. In order to improve an accuracy of OCR text recognition, a noise removement, a tilt correction, a character cutting and other pre-processing processes can be applied to each frame image. After pre-processing, the character recognition is performed to obtain the above-mentioned pending text.

Furthermore, the video to be processed can be segmented based on the text similarity of the image texts corresponding to adjacent video frames to obtain one or more pending video clips. For example, adjacent video frames of which image similarity is less than or equal to a second predetermined image similarity threshold can be used as segmented frames, and the video to be processed is segmented based on a plurality of segmented frames to obtain one or more undetermined video clips.

In this way, video frames with the same or similar image text can be segmented into one pending video clip, so that each pending video clip has the same or similar semantics.

S12. one or more pending audio clips of the video to be processed are obtained based on audio information.

For example, the audio text corresponding to the audio information can be obtained; segmentation inference can be performed on the audio text, and segmentation information in the audio text can be obtained; and one or more to-be-determined audio segments can be determined based on the segmentation information.

For example, automatic speech recognition (ASR) can be used to obtain an audio text corresponding to the audio information of the video to be processed, and a timestamp corresponding to each text character in each audio text. Then, sentence segmentation inference can be performed based on the audio text and the timestamp. For example, a time difference between adjacent text characters can be obtained, and two adjacent text characters with a time difference greater than a predetermined time threshold can be determined as sentence segmentation characters. A sentence segmentation punctuation mark of sentence segmentation can then be determined based on semantics before and after the segmentation characters. The sentence segmentation punctuation mark and position information of the sentence segmentation punctuation mark can be used as the above-mentioned sentence segmentation information. An audio between two sentence segmentation punctuation marks can be used as a pending audio clip.

It should be noted that the above obtaining of sentence segmentation characters and sentence segmentation punctuation marks can also be obtained by processing the audio text through a pre-trained text segmentation model. The structure and training method of the text segmentation model can refer to the implementation method in the existing technology. This disclosure is not limited in this aspect.

S13. the candidate video clip is determined based on the pending video clip and the pending audio segment.

In this step, the candidate video clip can be obtained by modifying the pending video clip based on the pending audio clip in the following ways:

First, a correspondence between the pending audio clip and the pending video clip is determined.

In this step, the correspondence between the pending audio clip and the pending video clip may be determined based on the text similarity between an audio text corresponding to the pending audio clip and an image text corresponding to the pending video clip.

For example, for each pending video clip, the pending audio clips are sorted based on the text similarity, and a pending audio clip with the highest text similarity is used as the pending audio clips corresponding to the pending video clip.

Furthermore, a time overlap can also be calculated based on starting time and ending time of the pending audio clip and the pending video clip in the video to be processed. For each pending video, a pending audio segment with the highest time overlap is used as the pending audio clip corresponding to the pending video clip.

Then, for each pending video clip, based on a pending audio clip corresponding to the pending video clip an integrity correction may be performed on the pending video clip to obtain the candidate video clip.

For example, the integrity correction operation may be performed on the pending video clip based on time information of the pending audio clip. The integrity correction operation may include correction of the starting and ending time of the video clip or merging of adjacent video clips.

For example, the time of the first pending video clip is between the 15th and 20th seconds after the video starts playing. If time of the first pending audio clip corresponding to the first pending video clip is a clip between the 15th second and the 21st second, the time of the first pending video clip can be corrected to 15 seconds to 20 seconds. In addition, in order to avoid duplication of video clips, the second pending video clip adjacent to the first pending video clip can also be corrected, for example, the time of the second pending video clip can be corrected from "the 21st second to the 30th second" to "the 22nd second to 30th second."

For example, the time of the first pending video clip is between the 15th and 20th seconds after the video starts playing, and the time of the adjacent second pending video clip is between the 21st and 25th seconds after the video starts playing. If the time of the first pending audio clip corresponding to the first pending video clip is between the 15th and the 25th seconds after the video starts playing, the second pending video clip and the first pending video clip can be merged into a new first pending video clip.

In this way, the integrity correction is performed on the video clips based on audio information, so that obtained candidate video clips can display complete semantics, thereby avoiding the semantics in the candidate video clips being truncated which results in the inability to display complete semantic information to the user.

In another embodiment of the present disclosure, the above-mentioned step 103 adds the target video clip to the position before the specified video frame in the video to be processed. The method of obtaining the target video may include:

First, the target video clip is updated based on preset description information.

The preset description information is used to represent the key information of the target video clip corresponding to the video to be processed. For example, the preset description information may be the text "Video Introduction", and the text is added to each video frame of the target video clip to prompt the user that the video frame is a video introduction part, not the main body content of the video.

Then, the updated target video clip is added to the position before the specified video frame in the video to be processed to obtain the target video.

In this way, the user can distinguish the target video clip showing key information and the main body content of the video, thereby avoiding the user's inability to understand the video information due to jumps in the video content.

FIG. 3 is a block diagram of a device for video processing according to example embodiments. As shown in FIG. 3, the device for video processing includes:

The information obtaining module 301 is used to obtain key information corresponding to a video to be processed;

The clip extraction module 302 is used to extract one or more target video clips from the video to be processed based on the key information;

The video processing module 303 is used to obtain a target video by adding the target video clip to a position preceding a specified video frame in the video to be processed, the specified video frame is any video frame of a top preset number of video frames in the video to be processed.

In some embodiments, the clip extraction module 302 is used to obtain one or more candidate video clips of the video to be processed based on image information and audio information of the video to be processed; where the one or more candidate video clips comprise a piece of complete semantic information in the video to be processed; obtain a similarity between each candidate video clip and the key information; determine one or more candidate video clips with the highest similarity as the target video clip.

In some embodiments, the clip extraction module 302 is used to obtain one or more pending video clips of the video to be processed based on the image information, and each of the pending video clips comprising one or more frames of images; based on the audio information, obtain one or more pending audio clips of the video to be processed; and determine the one or more candidate video clips based on the pending video clip and the pending audio clip.

In some embodiments, the clip extraction module 302 is used to obtain an image text of each frame image of the video to be processed; calculate a text similarity of image texts between adjacent frame images; and determine the pending video clip based on the text similarity.

In some embodiments, the clip extraction module 302 is used to obtain an audio text corresponding to the audio information; perform a sentence segmentation inference on the audio text to obtain sentence segmentation information in the audio text; and determine the one or more pending audio clips based on the sentence segmentation information.

In some embodiments, the clip extraction module 302 is used to determine a correspondence between the pending audio clip and the pending video clip; for each pending video clip, based on a pending audio clip corresponding to said pending video clip, perform an integrity correction on said pending video clip to obtain a candidate video clip.

In some embodiments, the video processing module 303 is used to update the target video clip based on predetermined description information, the predetermined description information being used to characterize the key information of the target video clip corresponding to the video to be processed; and obtain the target video by adding the updated target video clip to the position preceding the specified video frame in the video to be processed.

Figure 4:
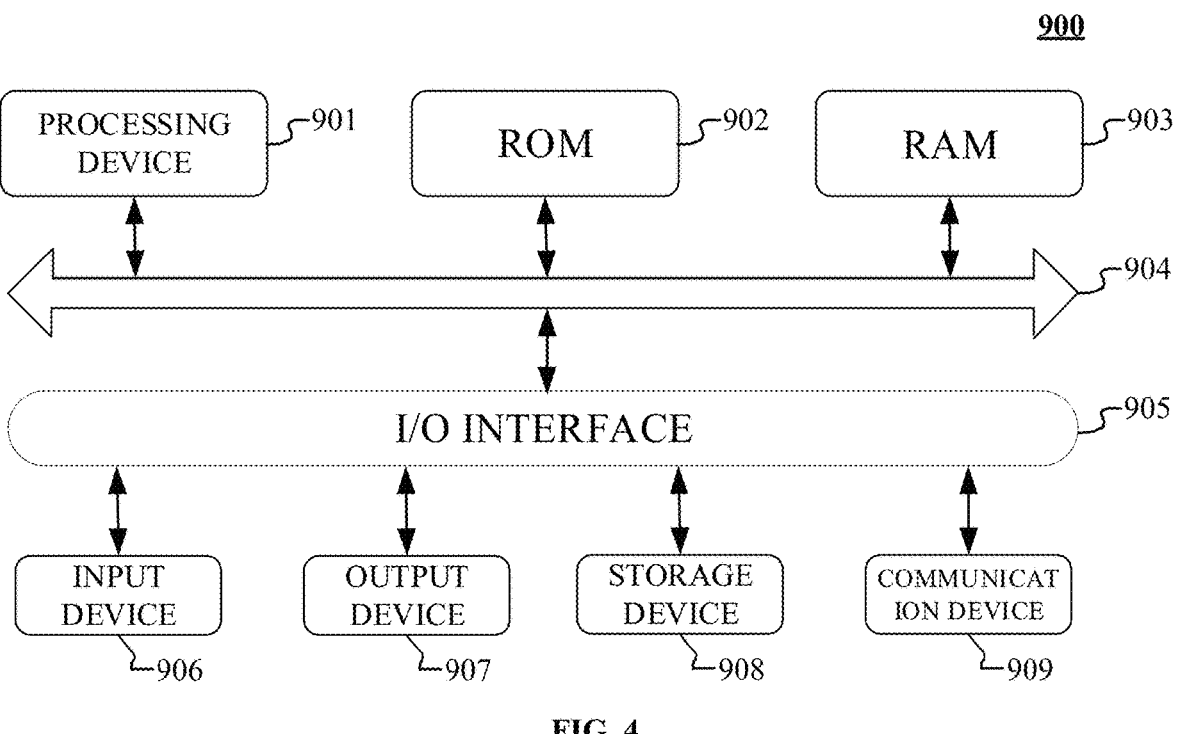
FIG. 4 is a block diagram of an electronic device according to example embodiments.

Referring now to FIG. 4, a schematic structural diagram of an electronic device (such as a terminal device or a server) 900 suitable for implementing embodiments of the present disclosure is shown. Terminal devices in embodiments of the present disclosure may include, but are not limited to, mobile phones, notebook computers, digital broadcast receivers, personal digital assistants (PDAs), PADs (tablet computers), portable multimedia players (PMP), vehicle-mounted terminals (such as, vehicle-mounted navigation terminals) and fixed terminals such as digital TVs, desktop computers, etc. The electronic device shown in FIG. 4 is only an example and should not impose any restrictions on the functions and scope of use of the embodiments of the present disclosure.

As shown in FIG. 4, the electronic device 900 may include a processing device (for example, a central processing unit, a graphics processing unit, and so on) 901, which may execute various appropriate actions and processes according to a program stored in a read-only memory (ROM) 902 or a program loaded from a storage device 908 to a random access memory (RAM) 903. Various programs and data required for the operation of the electronic device 900 are also stored in the RAM 903. The processing device 901, the ROM 902 and the RAM 903 are connected to each other via a bus 904. An input/output (I/O) interface 905 is also connected to bus 904.

Generally, the following devices may be connected to the I/O interface 905: input devices 906 including, for example, a touch screen, touch pad, keyboard, mouse, camera, microphone, accelerometer, gyroscope, etc.; an output device 907 including, for example, a liquid crystal display (LCD), speaker, vibration; a storage device 908 including a magnetic tape, a hard disk, etc.; and a communication device 909. The communication device 909 may allow the electronic device 900 to communicate wirelessly or wired with other devices to exchange data. Although FIG. 4 illustrates electronic device 900 with various devices, it should be understood that implementation or availability of all illustrated devices is not required. More or fewer devices may alternatively be implemented or provided.

In particular, according to embodiments of the present disclosure, the processes described above with reference to the flowcharts may be implemented as computer software programs. For example, embodiments of the present disclosure include a computer program product including a computer program carried on a non-transitory computer-readable medium, and the computer program includes program code for performing the method illustrated in the flowchart. In such embodiments, the computer program can be downloaded and installed from the network via the communication device 909, or from the storage device 908, or from the ROM 902. When the computer program is executed by the processing device 901, the above-mentioned functions defined in the method of embodiments of the present disclosure are performed.

It should be noted that the computer-readable medium mentioned above in the present disclosure may be a computer-readable signal medium or a computer-readable storage medium, or any combination of the above two. The computer-readable storage medium may be, for example, but not limited to, an electrical, magnetic, optical, electromagnetic, infrared, or semiconductor system, device or device, or any combination thereof. More specific examples of computer readable storage medium may include, but are not limited to: an electrical connection having one or more wires, a portable computer disk, a hard drive, random access memory (RAM), read only memory (ROM), removable memory Programmable read-only memory (EPROM or flash memory), optical fiber, portable compact disk read-only memory (CD-ROM), optical storage device, magnetic storage device, or any suitable combination of the above. In this disclosure, a computer-readable storage medium may be any tangible medium that contains or stores a program for use by or in connection with an instruction execution system, apparatus, or device. In the present disclosure, a computer-readable signal medium may include a data signal propagated in baseband or as part of a carrier wave, carrying computer-readable program code therein. Such propagated data signals may take many forms, including but not limited to electromagnetic signals, optical signals, or any suitable combination of the above. A computer-readable signal medium may also be any computer-readable medium other than a computer-readable storage medium that can send, propagate, or transmit a program for use by or in connection with an instruction execution system, apparatus, or device. Program code embodied on a computer-readable medium may be transmitted using any suitable medium, including but not limited to: wire, optical fiber cable, RF (radio frequency), etc., or any suitable combination of the foregoing.

In some embodiments, client and server can communicate using any currently known or future developed network protocol such as HTTP (HyperText Transfer Protocol) and can communicate with digital data in any form or medium communications (e.g., communication networks) interconnections. Examples of communications networks include local area networks ("LAN"), wide area networks ("WAN"), the Internet (e.g., the Internet), and end-to-end networks (e.g., ad hoc end-to-end networks), as well as any currently known or developed in the future network of.

The above-mentioned computer-readable medium may be included in the above-mentioned electronic device. It may also exist independently without being assembled into the electronic device.

The computer-readable medium may carry one or more programs. The one or more programs, when executed by the electronic device, cause the electronic device to: obtain key information corresponding to a video to be processed; extract one or more target video clips from the video to be processed based on the key information; obtain a target video by adding the target video clips to the position preceding a specified video frame in the video to be processed, the specified video frame being any video frame of a top preset number of video frames in the video to be processed.

Computer program code for performing the operations of the present disclosure may be written in one or more programming languages, including but not limited to object-oriented programming languages-such as Java, Smalltalk, C++, and also including conventional procedural programming languages-such as "C" or similar programming languages. The program code may execute entirely on the user's computer, partly on the user's computer, as a stand-alone software package, partly on the user's computer and partly on a remote computer or entirely on the remote computer or server. In scenarios involving remote computers, the remote computer can be connected to the user's computer through any kind of network, including a local area network (LAN) or a wide area network (WAN), or it can be connected to an external computer (such as using an internet service provider to connect via the Internet).

The flowcharts and block diagrams in the accompanying drawings illustrate the architecture, functionality, and operations of systems, methods, and computer program products that may be implemented in accordance with various embodiments of the present disclosure. In this regard, each block in the flowchart or block diagram may represent a module, segment, or portion of code that contains one or more logic functions that implement the specified executable instructions. It should also be noted that, in some alternative implementations, the functions noted in the block may occur out of the order noted in the figures. For example, two blocks shown one after another may actually execute substantially in parallel, or they may sometimes execute in the reverse order, depending on the functionality involved. It will also be noted that each block of the block diagram and/or flowchart illustration, and combinations of blocks in the block diagram and/or flowchart illustration, can be implemented by special purpose hardware-based systems that perform the specified functions or operations, or can be implemented using a combination of specialized hardware and computer instructions.

The modules involved in embodiments described in this disclosure can be implemented in software or hardware. Among them, the name of the module does not constitute a limitation on the module itself under certain circumstances. For example, the information obtaining module can also be described as "a module that obtains key information corresponding to the video to be processed."

The functions described above herein may be performed, at least in part, by one or more hardware logic components. For example, and without limitation, example types of hardware logic components that may be used include Field Programmable Gate Arrays (FPGAs), Application Specific Integrated Circuits (ASICs), Application Specific Standard Products (ASSPs), Systems on Chips (SOCs), Complex Programmable Logical device (CPLD) and so on.

In the context of this disclosure, a machine-readable medium may be a tangible medium that may contain or store a program for use by or in connection with an instruction execution system, apparatus, or device. The machine-readable medium may be a machine-readable signal medium or a machine-readable storage medium. Machine-readable media may include, but are not limited to, electronic, magnetic, optical, electromagnetic, infrared, or semiconductor systems, devices or devices, or any suitable combination of the foregoing. More specific examples of machine-readable storage media would include one or more wires based electrical connection, laptop disk, hard drive, random access memory (RAM), read only memory (ROM), erasable programmable read only memory (EPROM or flash memory), optical fiber, portable compact disk read-only memory (CD-ROM), optical storage device, magnetic storage device, or any suitable combination of the above.

According to one or more embodiments of the present disclosure, Example 1 provides a method for video processing, the method includes:

Obtaining key information corresponding to a video to be processed;

Extracting one or more target video clips from the video to be processed based on the key information; and Obtaining a target video by adding the target video clip to a position preceding a specified video frame in the video to be processed, the specified video frame being any video frame of a top present number of video frames in the video to be processed.

According to one or more embodiments of the present disclosure, Example 2 provides the method described in Example 1, the extracting one or more target video clips from the video to be processed based on the key information comprises:

Obtaining one or more candidate video clips of the video to be processed based on image information and audio information of the video to be processed, wherein the one or more candidate video clips comprise a piece of complete semantic information in the video to be processed;

Obtaining a similarity between each candidate video clip and the key information; and Determining one or more candidate video clips with the highest similarity as the one or more target video clips.

According one or more embodiments of the present disclosure, Example 3 provides the method described in Example 2, the obtaining one or more candidate video clips of the video to be processed based on the image information and audio information of the video to be processed comprises:

Obtaining one or more pending video clips of the video to be processed based on the image information, each of the pending video clips comprising one or more frames of images;

Obtaining one or more pending audio clips of the video to be processed based on the audio information; and Determining the one or more candidate video clips based on the pending video clip and the pending audio clip.

According to one or more embodiments of the present disclosure, Example 4 provides the method described in Example 3, the obtaining one or more pending video clips of the video to be processed based on the image information comprises:

Obtaining an image text of each frame image of the video to be processed;

Calculating a text similarity of image texts between adjacent frame images; and

Determining the pending video clip based on the text similarity.

According to one or more embodiments of the present disclosure, Example 5 provides the method described in Example 3, the obtaining one or more pending audio clips of the video to be processed based on the audio information comprises:

Obtaining an audio text corresponding to the audio information;

Performing a sentence segmentation inference on the audio text to obtain sentence segmentation information in the audio text; and Determining the one or more pending audio clips based on the sentence segmentation information.

According to one or more embodiments of the present disclosure, Example 6 provides the method described in Example 3, the determining the candidate video clip based on the pending video clip and the pending audio clip comprises:

Determining a correspondence between the pending audio clip and the pending video clip; and For each pending video clip, based on a pending audio clip corresponding to said pending video clip, performing an integrity correction on said pending video clip to obtain a candidate video clip.

According to one or more embodiments of the present disclosure, Example 7 provides the method of any one of Examples 1 to 6, the adding the target video clip to a position preceding the specified video frame in the video to be processed to obtain the target video comprises:

Updating the target video clip based on predetermined description information, the predetermined description information being used to characterize the key information of the target video clip corresponding to the video to be processed; and Obtaining the target video by adding the updated target video clip to the position preceding the specified video frame in the video to be processed.

According to one or more embodiments of the present disclosure, Example 8 provides a device for video processing, the device including:

An information obtaining module for obtaining key information corresponding to a video to be processed;

A clip extraction module for extracting one or more target video clips from the video to be processed based on the key information; and A video processing module for obtaining a target video by adding the target video clip to a position preceding a specified video frame in the video to be processed, the specified video frame being any video frame of a top preset number of video frames in the video to be processed.

According to one or more embodiments of the present disclosure, Example 9 provides the device described in Example 8. The clip extraction module is used for obtaining one or more candidate video clips of the video to be processed based on image information and audio information of the video to be processed, wherein the one or more candidate video clips comprise a piece of complete semantic information in the video to be processed; obtaining a similarity between each candidate video clip and the key information; and determining one or more candidate video clips with the highest similarity as the one or more target video clips.

According to one or more embodiments of the present disclosure, Example 10 provides the device described in Example 9. The clip extraction module is used for obtaining one or more pending video clips of the video to be processed based on the image information, each of the pending video clips comprising one or more frames of images; obtaining one or more pending audio clips of the video to be processed based on the audio information; and determining the one or more candidate video clips based on the pending video clip and the pending audio clip.

According to one or more embodiments of the present disclosure, Example 11 provides the device described in Example 10. The clip extraction module is used for obtaining an image text of each frame image of the video to be processed; calculating a text similarity of image texts between adjacent frame images; and determining the pending video clip based on the text similarity.

According to one or more embodiments of the present disclosure, Example 12 provides the device described in Example 10. The clip extraction module is used for obtaining an audio text corresponding to the audio information; performing a sentence segmentation inference on the audio text to obtain sentence segmentation information in the audio text; and determining the one or more pending audio clips based on the sentence segmentation information.

According to one or more embodiments of the present disclosure, Example 13 provides the device described in Example 10. The clip extraction module is used for determining a correspondence between the pending audio clip and the pending video clip; and for each pending video clip, based on a pending audio clip corresponding to said pending video clip, performing an integrity correction on said pending video clip to obtain a candidate video clip.

According to one or more embodiments of the present disclosure, Example 14 provides the device of any one of Examples 8 to 13. The video processing module is used for updating the target video clip based on predetermined description information, the predetermined description information being used to characterize the key information of the target video clip corresponding to the video to be processed; and obtaining the target video by adding the updated target video clip to the position preceding the specified video frame in the video to be processed.

The above description is only a description of the preferred embodiments of the present disclosure and the technical principles used. Those skilled in the art should understand that the disclosure scope involved in the present disclosure is not limited to technical solutions composed of specific combinations of the above technical features, but should also cover solutions composed of the above technical features or without departing from the above disclosed concept. Other technical solutions formed by any combination of equivalent features. For example, a technical solution is formed by replacing the above features with technical features with similar functions disclosed in this disclosure (but not limited to).

Furthermore, although operations are depicted in a specific order, this should not be understood as requiring that these operations be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features described in the context of individual embodiments may also be implemented in combination in a single embodiment. Conversely, various features that are described in the context of a single embodiment can also be implemented in multiple embodiments individually or in any suitable sub combination.

Although the present subject matter has been described in language specific to structural features and/or methodological logical acts, it should be understood that the subject matter defined in the accompanying claims is not necessarily limited to the specific features or acts described above. Rather, the specific features and actions described above are merely example forms of implementing claims. Regarding the devices in the above embodiments, the specific manner in which each module performs operations has been described in detail in the embodiments related to the method, and will not be elaborated here.

We claim:

1. A method for video processing, comprising:
obtaining key information corresponding to a video to be processed;
extracting one or more target video clips from the video to be processed based on the key information, wherein the extracting one or more target video clips from the video to be processed based on the key information comprises:
obtaining one or more candidate video clips of the video to be processed based on image information and audio information of the video to be processed, wherein the one or more candidate video clips comprise a piece of complete semantic information in the video to be processed;
obtaining a similarity between each candidate video clip and the key information; and
determining one or more candidate video clips with a highest similarity as the one or more target video clips; and
obtaining a target video by adding the target video clip to a position preceding a specified video frame in the video to be processed, the specified video frame being any video frame of the first N video frames in the video to be processed, wherein N is a fixed number.

2. The method of claim 1, wherein the adding the target video clip to a position preceding the specified video frame in the video to be processed to obtain the target video comprises:
updating the target video clip based on predetermined description information, the predetermined description information being used to characterize the key information of the target video clip corresponding to the video to be processed; and
obtaining the target video by adding the updated target video clip to the position preceding the specified video frame in the video to be processed.

3. The method of claim 1, wherein the obtaining one or more candidate video clips of the video to be processed based on the image information and audio information of the video to be processed comprises:
obtaining one or more pending video clips of the video to be processed based on the image information, each of the pending video clips comprising one or more frames of images;
obtaining one or more pending audio clips of the video to be processed based on the audio information; and
determining the one or more candidate video clips based on the pending video clip and the pending audio clip.

4. The method of claim 3, wherein the obtaining one or more pending video clips of the video to be processed based on the image information comprises:

obtaining an image text of each frame image of the video to be processed;

calculating a text similarity of image texts between adjacent frame images; and determining the pending video clip based on the text similarity.

5. The method of claim 3, wherein the obtaining one or more pending audio clips of the video to be processed based on the audio information comprises:

obtaining an audio text corresponding to the audio information;

performing a sentence segmentation inference on the audio text to obtain sentence segmentation information in the audio text; and determining the one or more pending audio clips based on the sentence segmentation information.

6. The method of claim 3, wherein the adding the target video clip to a position preceding the specified video frame in the video to be processed to obtain the target video comprises:

updating the target video clip based on predetermined description information, the predetermined description information being used to characterize the key information of the target video clip corresponding to the video to be processed; and obtaining the target video by adding the updated target video clip to the position preceding the specified video frame in the video to be processed.

7. The method of claim 3, wherein the determining the candidate video clip based on the pending video clip and the pending audio clip comprises:

determining a correspondence between the pending audio clip and the pending video clip; and for each pending video clip, based on a pending audio clip corresponding to said pending video clip, performing an integrity correction on said pending video clip to obtain a candidate video clip.

8. The method of claim 7, wherein the adding the target video clip to a position preceding the specified video frame in the video to be processed to obtain the target video comprises:

updating the target video clip based on predetermined description information, the predetermined description information being used to characterize the key information of the target video clip corresponding to the video to be processed; and obtaining the target video by adding the updated target video clip to the position preceding the specified video frame in the video to be processed.

9. A non-transitory computer-readable medium having a computer program stored thereon, wherein the computer program, when executed by a processing device, cause the processing device to:

obtain key information corresponding to a video to be processed;

extract one or more target video clips from the video to be processed based on the key information, wherein the extracting one or more target video clips from the video to be processed based on the key information comprises:

obtaining one or more candidate video clips of the video to be processed based on image information and audio information of the video to be processed, wherein the one or more candidate video clips comprise a piece of complete semantic information in the video to be processed;

obtaining a similarity between each candidate video clip and the key information; and determining one or more candidate video clips with a highest similarity as the one or more target video clips; and obtain a target video by adding the target video clip to a position preceding a specified video frame in the video to be processed, the specified video frame being any video frame the first N video frames in the video to be processed, wherein N is a fixed number.

10. The non-transitory computer-readable medium of claim 9, wherein the processing device is further caused to:

obtain one or more pending video clips of the video to be processed based on image information, each of the pending video clips comprising one or more frames of images;

obtain one or more pending audio clips of the video to be processed based on the audio information; and determine one or more candidate video clips based on the pending video clip and the pending audio clip.

11. An electronic device, comprising:

a storage device having a computer program stored thereon;

a processing device for executing the computer program on a storage device to perform:

obtaining key information corresponding to a video to be processed;

extracting one or more target video clips from the video to be processed based on the key information, wherein the extracting one or more target video clips from the video to be processed based on the key information comprises:

obtaining one or more candidate video clips of the video to be processed based on image information and audio information of the video to be processed, wherein the one or more candidate video clips comprise a piece of complete semantic information in the video to be processed;

obtaining a similarity between each candidate video clip and the key information; and determining one or more candidate video clips with a highest similarity as the one or more target video clips; and obtaining a target video by adding the target video clip to a position preceding a specified video frame in the video to be processed, the specified video frame being any video frame of the first N video frames in the video to be processed, wherein N is a fixed number.

12. The electronic device of claim 11, wherein the obtaining one or more candidate video clips of the video to be processed based on the image information and audio information of the video to be processed comprises:

obtaining one or more pending video clips of the video to be processed based on the image information, each of the pending video clips comprising one or more frames of images;

obtaining one or more pending audio clips of the video to be processed based on the audio information; and determining the one or more candidate video clips based on the pending video clip and the pending audio clip.

13. The electronic device of claim 12, wherein the obtaining one or more pending video clips of the video to be processed based on the image information comprises:

obtaining an image text of each frame image of the video to be processed;

calculating a text similarity of image texts between adjacent frame images; and determining the pending video clip based on the text similarity.

14. The electronic device of claim 12, wherein the obtaining one or more pending audio clips of the video to be processed based on the audio information comprises:

obtaining an audio text corresponding to the audio information;

performing a sentence segmentation inference on the audio text to obtain sentence segmentation information in the audio text; and determining the one or more pending audio clips based on the sentence segmentation information.

15. The electronic device of claim 12, wherein the determining the candidate video clip based on the pending video clip and the pending audio clip comprises:

determining a correspondence between the pending audio clip and the pending video clip; and for each pending video clip, based on a pending audio clip corresponding to said pending video clip, performing an integrity correction on said pending video clip to obtain a candidate video clip.

16. The electronic device of claim 15, wherein the adding the target video clip to a position preceding the specified video frame in the video to be processed to obtain the target video comprises:

updating the target video clip based on predetermined description information, the predetermined description information being used to characterize the key information of the target video clip corresponding to the video to be processed; and obtaining the target video by adding the updated target video clip to the position preceding the specified video frame in the video to be processed.

17. The electronic device of claim 11, wherein the adding the target video clip to a position preceding the specified video frame in the video to be processed to obtain the target video comprises:

updating the target video clip based on predetermined description information, the predetermined description information being used to characterize the key information of the target video clip corresponding to the video to be processed; and obtaining the target video by adding the updated target video clip to the position preceding the specified video frame in the video to be processed.

* * * * *